Figure 4:
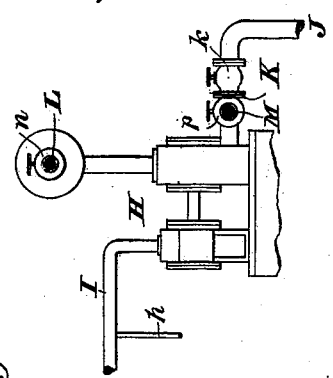

H. R. SMITH.
Hydrocarbon Furnace.
No. 219,991. Patented Sept. 23, 1879.
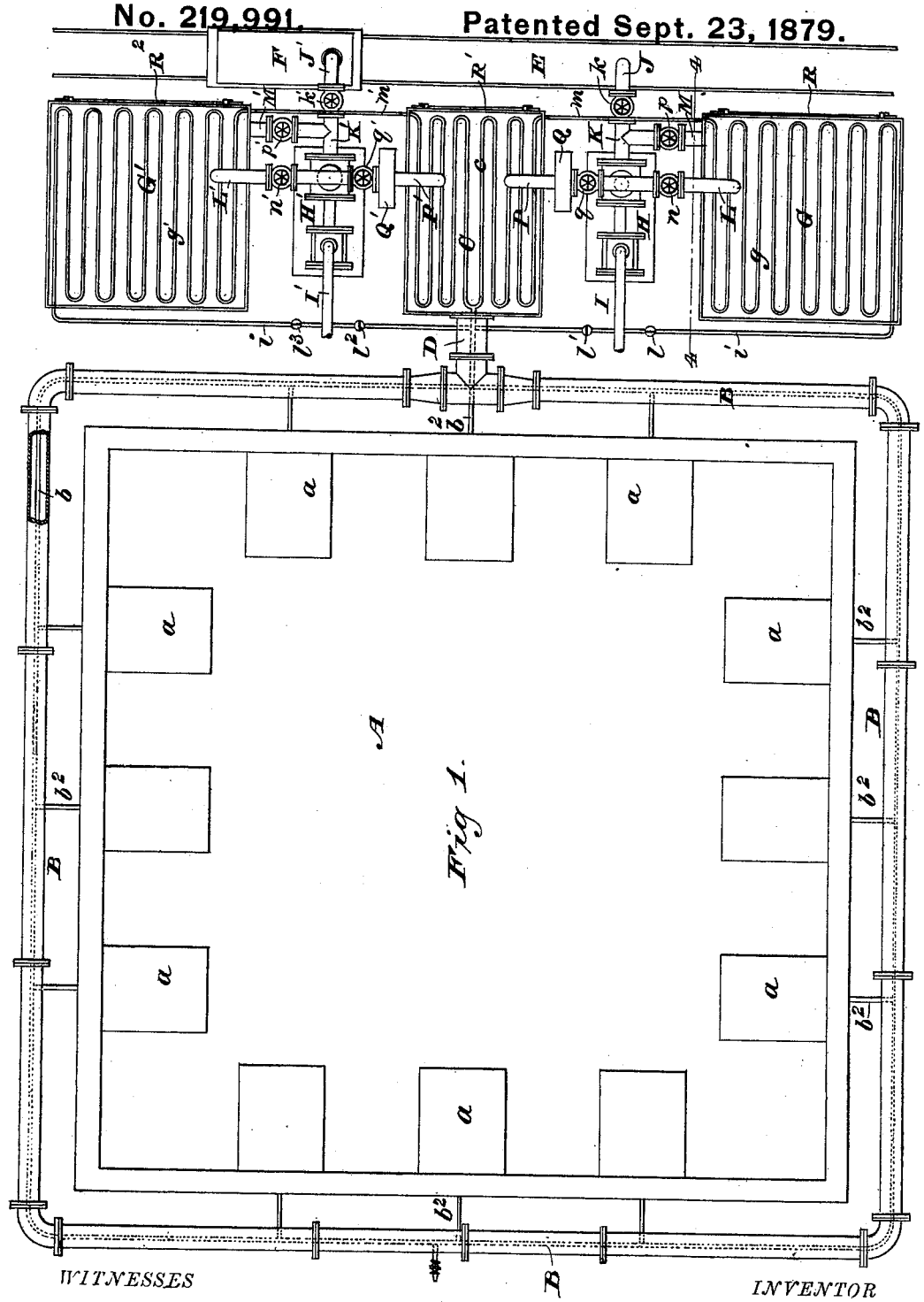
WITNESSES
Wm A Skinkle
Geo W Breck
INVENTOR
Herbert R Smith
By his Attorneys
Baldwin, Hopkins & Peyton

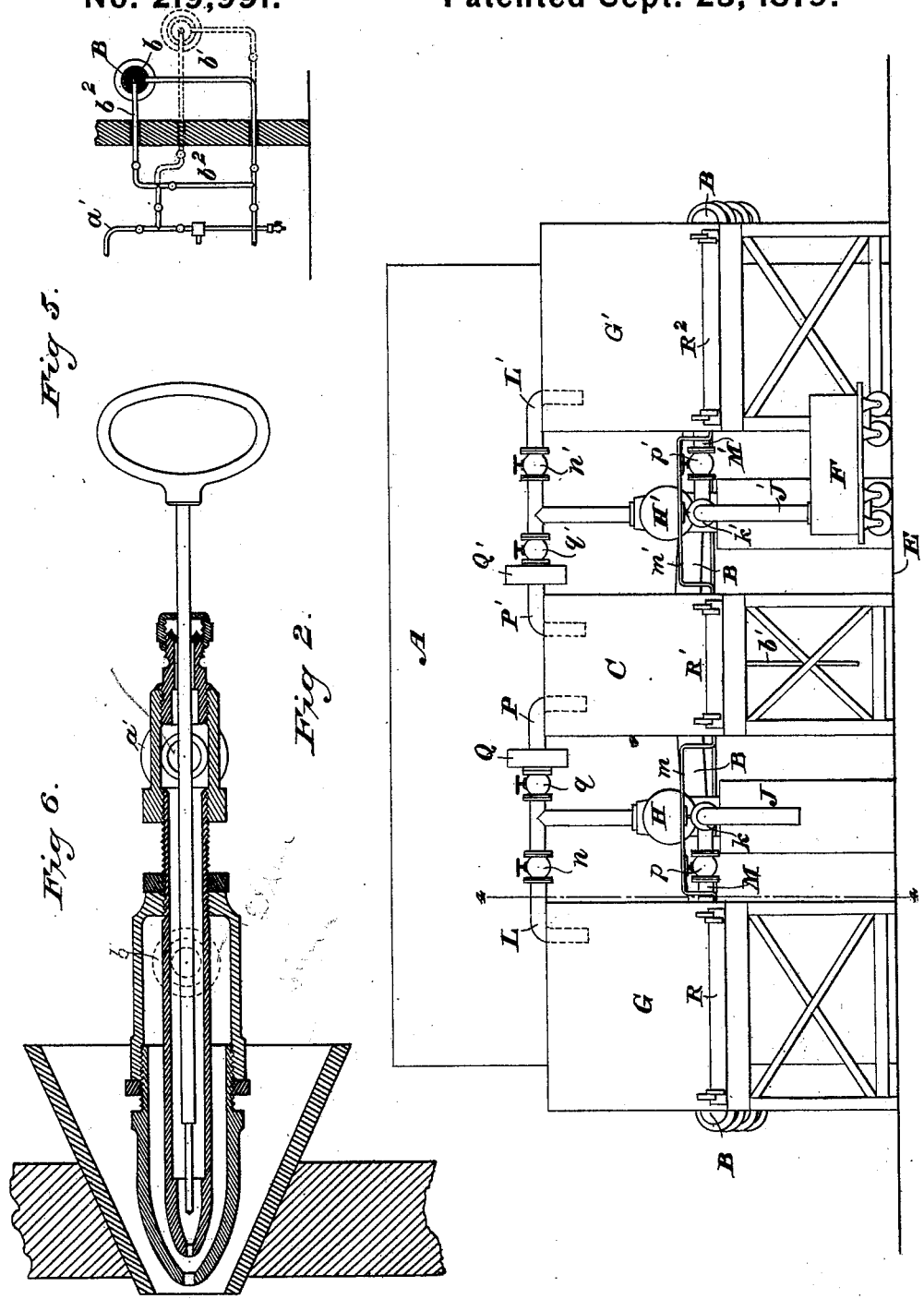

3 Sheets—Sheet 3.

H. R. SMITH.
Hydrocarbon Furnace.

No. 219,991. Patented Sept. 23, 1879.

WITNESSES
Wm A Skinkle
Geo W Breck

INVENTOR
Herbert R Smith
By his Attorneys
Baldwin, Hopkins & Peyton

UNITED STATES PATENT OFFICE.

HERBERT R. SMITH, OF COLUMBUS, OHIO.

IMPROVEMENT IN HYDROCARBON-FURNACES.

Specification forming part of Letters Patent No. 219,991, dated September 23, 1879; application filed February 3, 1879.

*To all whom it may concern:*

Be it known that I, HERBERT R. SMITH, of Columbus, in the county of Franklin and State of Ohio, have invented certain new and useful Improvements in Supplying Liquid or Semi-Liquid Fuel to Furnaces, of which the following is a specification.

My invention relates to improvements in apparatus for supplying or feeding suitable hydrocarbon fuels to plants or series of furnaces, into which the liquid or semi-liquid fuel is sprayed, commingled with air and steam, over fires or incandescent beds of fuel in the furnace combustion-chambers, and there burned for heating boilers, for manufacturing iron, glass-making, &c.

My improvements are chiefly designed for use in connection with certain methods of and apparatus for supplying and burning liquid fuels in furnaces invented by Silas C. Salisbury, of New York city, and by John Rogers, of Columbus, Ohio, prior to my invention.

Sundry Letters Patent of the United States have heretofore been granted to said Salisbury for inventions of the class referred to, among which may be mentioned that of June 18, 1878, No. 205,143; and such inventions are not herein claimed.

The invention of Rogers, above referred to, relates to certain important features of the apparatus which are embodied in my improvements, but not claimed by me, which may generally be described as follows: A large pipe or fuel-reservoir is provided with a small pipe extending longitudinally through it, and supplied with steam to warm the fuel (gas-tar or coal-tar) which surrounds the steam-pipe. From this reservoir a branch pipe or fuel-feed pipe passes to an injector, and from the steam-pipe in the reservoir passes a steam-pipe to said fuel-feed pipe. The injector has two chambers, one for the fuel and the other for superheated steam, and an air box or funnel surrounds the injector at its entrance to the furnace. Superheated steam, liquid fuel, and air in commingled spray or jets enter the furnace above the incandescent fuel and are burned in the combustion-chamber. Provision is made for clearing the injector by a rod working endwise therein and through the jet-openings or nozzles of both tubes of the injector. Connection is made between the superheated-steam pipe and the steam-pipe which is supplied from the reservoir steam-pipe; and the several pipes are provided with cocks, and so combined that superheated steam or live steam may be supplied to either the steam-chamber or the fuel-chamber of the injector, to the fuel-feed pipe, and to the fuel-reservoir. The injector and the fuel-feed pipe can be cleaned out by admitting steam to them, and the warming of the tar in the reservoir be facilitated by admitting steam to it by way of the fuel-feed pipe. Particular description of some of the said improvements of Rogers is hereinafter given.

My object generally is to improve, perfect, and adapt for economic use upon a large scale the above-mentioned prior inventions, and others of the class to which my improvements belong.

My improvements may be stated to consist, in part, in a novel method of feeding or supplying the furnaces with the fuel—that is to say, warming the fuel in a suitable tank or reservoir, so that it will flow readily, straining it to remove lumps, foreign substances, &c., and conducting it to each furnace of a number or series, or to each furnace of a plant, by way of a common feed-pipe supplied from a reservoir common to all the furnaces, the said feed-pipe having independent connections with each of the furnaces of the series supplied by it, so that any furnace, or any number of the furnaces, may be worked, or the working of a portion of them stopped, without interfering with each other or with the supply pipe or reservoir, whereby economy of construction, time, labor, and space is attained, as hereinafter more fully explained.

Further, the improvements consist in novel organizations of parts and in certain combinations hereinafter designated by the claim, after being first fully described by reference to the accompanying drawings, in which I have shown the preferable way—that now best known to me—of adapting all my improvements for use in connection with a plant of furnaces.

Illustration and description, with sufficient fullness to render intelligible my invention, will be given of such features of the prior inventions, hereinbefore referred to, as are used in conjunction with but not claimed by themselves in my improvements.

Figure 3:
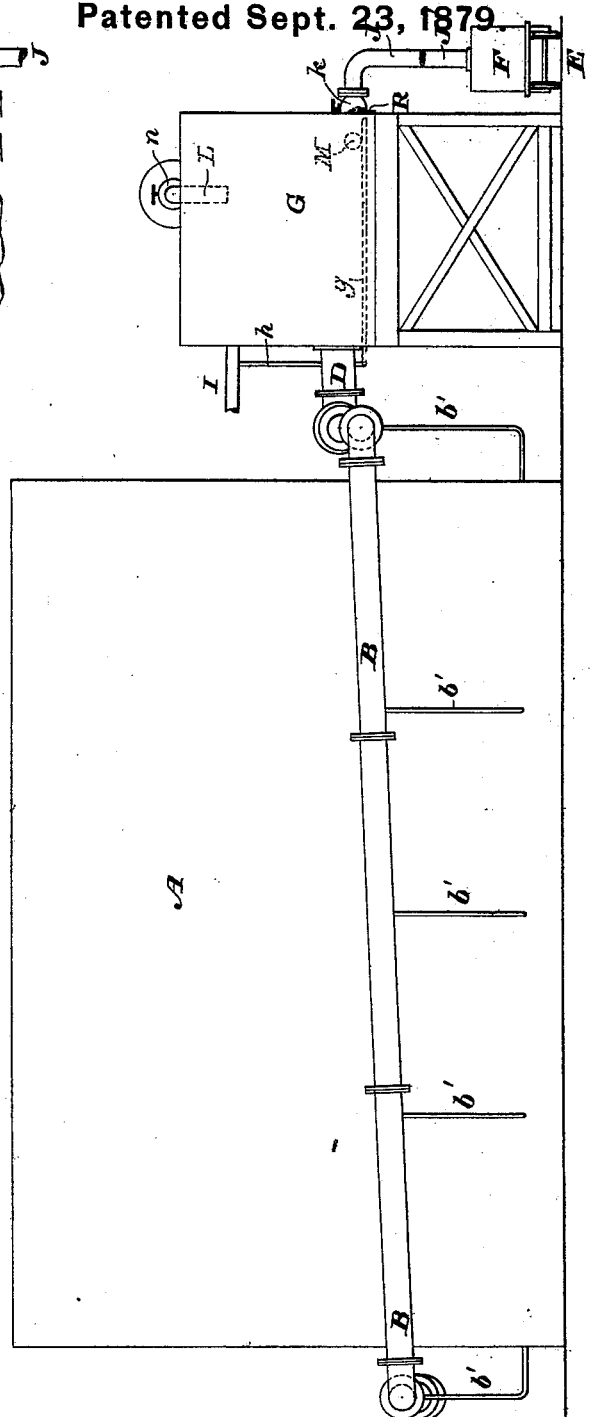

Figure 1 is a plan or top view of a rectangular plant of furnaces with my improvements applied thereto; Fig. 2, an elevation of the same, as seen from the tank end, showing the outer sides of the tanks, with their pumping appliances, &c.; Fig. 3, a side elevation. Fig. 4 is a vertical section on the lines 4 4 of Figs. 1 and 2, showing one of the pumps in side view, with its connections. Fig. 5 is a detail view, showing, partly in elevation and partly in vertical section, the main feed-pipe and its connections leading to an injector, the arrangement of parts being in some respects different from that represented in the preceding figures, certain modifications being also shown; and Fig. 6 is a horizontal central section through one of the injectors, on an enlarged scale.

A series or plant, A, of suitably-constructed furnaces is arranged in any of the usual ways, according to the number and size of the furnaces and the space at disposal. A square plant is shown in the drawings; but it may be oval, triangular, consist of two rows only, &c., as is well understood.

A large feed-pipe or liquid-fuel-supplying pipe, B, surrounds the furnaces $a$ of the series or plant A. This pipe is large enough—say twelve inches in diameter—to supply fuel to all the furnaces at once, and is arranged at a proper distance from the furnaces to allow ample space for the workmen to pass to and fro to work the furnaces, &c.

A small pipe, $b$, for steam, passes centrally along the feed-pipe B throughout. This main feed-pipe B and its warming-pipe $b$ are the same as represented in the application of John Rogers for Letters Patent of the United States, filed on or about the 20th of January, 1879, for improvements invented by him, as hereinbefore mentioned, except that in the said Rogers invention the large pipe is, in fact, simply a reservoir, instead of being, as in my invention, a main feed-pipe supplied by a reservoir and feeding a series of furnaces which it surrounds, or along by which it passes. The connections between the pipes B and $b$ and the injectors for a series of furnaces are substantially identical with the corresponding parts in the said invention of Rogers, so far as they are embodied by him, the injector, superheated-steam pipe, cocks for regulating the supply of steam and directing its course, and means for clearing out the injector being also the same as in the said improvements of Rogers.

These devices may be briefly described as follows: For each furnace there is the lateral service-pipe or small branch feed-pipe, $b^1$, leading from the main or supply pipe B to the fuel-chamber of the injector, (shown in detail in Fig. 6,) and the connecting steam-pipe $b^2$, communicating at opposite ends with the steam-pipe $b$ and the lateral feed-pipe $b^1$. Suitable cocks or valves in the pipes $b^1$ $b^2$ enable the attendant to direct the steam by way of these pipes to the injector or to the supply-pipe B when the fuel-supply is cut off. The superheated-steam pipe $a'$ communicates with the steam-chamber of the injector, and there is one of these pipes for every furnace, injector, and set of pipes $b^1$ and $b^2$, and a pipe connecting the superheated-steam pipe with the steam-pipe $b^2$. Suitable valves in the superheated-steam pipe and its branch connecting with the steam-pipe $b^2$, in connection with the valves in the pipes $b^1$ and $b^2$, enable the attendant to direct the superheated steam to the fuel-passage of the injector by way of the pipe $b^1$, or to the supply-pipe B, and also permits of directing the live steam from the pipe $b^2$ to the injector steam-passage to clear the injector-nozzles.

In addition to the adaptation of the above inventions to a plant of furnaces, my improvements are as now to be described.

For large furnaces there may be two injectors, or even more, and there are separate steam and feed pipe connections for the respective injectors of each furnace.

At one side or end of the series or plant A of furnaces the fuel-supply pipe or main feed-pipe B connects with a supply-tank or service-reservoir, C, from which the liquid fuel flows by the feed-pipe around the plant. To insure a proper delivery of the fuel from the tank C to all the furnaces by the pipe B, this pipe is highest at its connection D with the tank, and slopes downward slightly to its lowest point, at the opposite end or back of the plant, where a blow-off cock is provided. The connecting-pipe D enters the tanks sufficiently far above its bottom to draw off the fuel above the accumulated sediment on the tank-bottom.

A railway, E, extends along by the tank C. Cars F loaded with gas-tar or any suitable hydrocarbon fuel may be run in on this track, and their contents pumped directly into one or more main reservoirs or storage-tanks, G G'. (The track and the car shown by the drawings are drawn on a reduced scale, much smaller, proportionately, than other parts.)

In using for fuel what is commonly known as "gas-tar" or "coal-tar," (the residuum resulting from the destructive distillation of coal in the manufacture of illuminating-gas,) it becomes necessary to provide means for softening the tar before leaving the reservoir C, so that it will flow or may be supplied to the furnaces by the feed-pipe B. The tar when in this pipe is softened by steam, as before mentioned.

To fill the tanks and properly supply the feed-pipe I employ the following apparatus: Two steam-pumps, H H', of usual and well-known construction, are located in suitable position relatively to the railway and tanks, there being a pump on either side of the central or service tank, C, and between it and the storage-tanks G and G', which are located on opposite sides of the service-tank. Steam-pipes I I' take their supply of steam from any suitable source to work the pumps. The steam is preferably generated in a suitable boiler or boilers in the furnace nearest the pumps and their pipes I I'. Flexible pipes J J' are passed into the cars (or are inserted into barrels which may be run in on hand-trucks) to pump the tar into the storage-tank G or G', by way of the pipe K or by the pipe K', according to which pump is being worked. The tanks C, G, and G' are supplied, respectively, with coils of steam-pipe $c$, $g$, and $g'$, to heat the tar as required. In the construction shown these coils and the warming-pipe $b$ in the feed-pipe B are connected or continued the one to the other, and steam supplied to all from the pipes I I' by pipes $h$ leading to that portion, $i$, of the steam-pipe which passes from one storage-tank to the other.

Suitable cocks and valves are provided to regulate the flow of steam as required, so as to throw the pumps into and out of operation, admit steam to and shut it off from the tanks, &c. By means of the cocks $l$ $l^1$ $l^2$ $l^3$ and suitable cocks in the connecting-pipes $m$ and $m'$ between the central or service tank and the storage-tanks, steam may be admitted to any one of the tanks while shut off from the others, or to two tanks while excluded from the remaining tank, as will readily be understood.

In transferring the tar from the storage-tanks to the service-tank or central reservoir, C, directly supplying the feed-pipe B, the valves $n$ and $n'$ of the storage-tank filling-pipes L and L' are closed, as are also the valves $k$ $k'$ in the pipes K and K'. The valves $p$ $p'$ in the emptying-pipes M M' of the storage-tanks are opened, and also the valves $q$ $q'$ in the filling-pipes P P' of the tank C. The pumps (or it may be only one pump if but one storage-tank and pump are employed, or it is desired to pump from one only where two are used) are then put to work, and the tar is pumped by way of the pipes M M' and P P' into the service-tank.

Filtering-chambers or strainers Q Q' in the pipes P P' clear the tar of all lumps, sticks, and other impurities or injurious foreign matters, which would if not removed interfere with the working of the apparatus. By thus straining the tar I avoid what has, in some instances, proved a serious obstacle in the way of the proper working of the injectors through which the fuel is fed to the furnaces, as well as prevent the clogging of the main feed-pipe and its lateral pipes $b^2$.

The coils of pipes in the several tanks are arranged near the bottoms, but sufficiently above the bottoms of the tanks—say about a foot—to enable an attendant to clear out the refuse which is found accumulated upon the tank-bottoms when the tanks are empty. Tightly-fitting doors or hinged flaps R $R^1$ $R^2$ are provided at the sides of the tanks, near their bottoms, to give access to them when empty, and enable an attendant to clean them out beneath the pipes with a rake or hoe.

By the construction above described I am enabled to employ a common fuel-feeder or supply-tank for all of the furnaces of a plant, supply the fuel to all or to any desired number of the furnaces by the common feed-pipe, prepare the fuel for most advantageous use, economize space, lessen labor, and cheapen the adaptation of the invention to use upon a large scale, such as for simultaneously heating the furnaces of a rolling-mill, of glass-works, &c. Obviously, the supply-pipe B may be divided into two sections, each part supplying half the furnaces of the plant, so that in event of accident or need for repairs the stoppage of work with one series of furnaces will not interfere with the work of the other.

The main feed-pipe B, in practice, is boxed or inclosed by suitable covering to protect it from the cold, lessen the liability of the tar to harden or clog, and enable the attendant to quickly soften the tar by the use of steam in the pipe $b$. The pipe B may be left uncovered at intervals, so that fires may be built to heat the pipe when required, as in cold weather, to warm the tar. Small furnaces are to be provided under the pipe for this purpose.

The steam-pipe $b$ is supported in proper position in the main feed-pipe B in suitable way, as, for instance, by washers clamped between the flanges which connect the sections of the pipe B, the said washers being provided with arms, say three in number, abutting against the steam-pipe and holding it centrally in the pipe B; or a single hooked rod projecting from the washer may embrace the steam-pipe. Small racks or narrow blocks would answer to support the steam-pipe without materially interfering with the flow of the tar.

Obviously, my improvements may be modified in some respects without departing from my invention. For instance, the main feed-pipe B may be duplicated, a second pipe, as shown by dotted lines in Fig. 5, being employed, the connections $b^1$ and $b^2$ being also in part duplicated and provided with cocks. In this way, should one of the pipes B become clogged and need repairs, the other may be used to supply the furnaces. More than one service-tank C may be employed. The tar may be pumped into the pipe D, and thus forced to the furnaces under pressure. One or several small auxiliary service-tanks may be located about the plant and be supplied from the service-tank C, so as to supply one or more furnaces separately from the rest and without keeping the pipe or pipes B full. This pipe, or the two pipes B, may be taken over the tops of the furnaces, or be carried along the inside of the plant, in case the furnaces are fired on that side or face toward the mill or works. Instead of using steam to clean out the pipes and heat the tar in the reservoirs and pipes, hot air or water may be employed.

When the tar is first pumped into the storage-tanks from the cars it is quite thick—too thick to be readily supplied in a pure or strained condition to the furnaces. It is, therefore, important to heat the tar and make it more liquid before straining it and passing it to the service-tank to be conducted to the furnaces.

I claim as of my own invention—

1. The combination of the series or plant of furnaces, the main feed-pipe surrounding them, the lateral or branch feed-pipes, the heating-pipe in the main feed-pipe, the service tank or reservoir, and the heating-pipe therein, substantially as and for the purpose hereinbefore set forth.

2. The combination, substantially as hereinbefore set forth, of the storage tank or tanks, the heating-pipes therein, the service-tank supplying the feed-pipe, the pump or pumps, and the pipes provided with the valves and connecting the tanks, to transfer the warmed contents of the storage tank or tanks to the service-tank, for the purpose specified.

3. The combination of the service-tank, the storage-tank, the pipe by which to convey the contents of the storage-tank to the service-tank, and the strainer in said pipe, substantially as and for the purpose set forth.

In testimony whereof I have hereunto subscribed my name.

HERBERT R. SMITH.

Witnesses:
OLIN J. CLAUSON,
G. A. SAXER.